United States Patent [19]

Merten et al.

[11] Patent Number: 4,861,105
[45] Date of Patent: Aug. 29, 1989

[54] INFANT CAR SEAT MOUNTABLE ON A GROCERY CART

[75] Inventors: Barron C. Merten, Orchard Park; Kenneth P. Morton, East Aurora, both of N.Y.

[73] Assignee: The Quaker Oats Company, Chicago, Ill.

[21] Appl. No.: 232,487

[22] Filed: Aug. 15, 1988

[51] Int. Cl.[4] ............................................. A47D 1/10
[52] U.S. Cl. .................................... 297/250; 297/130; 297/258
[58] Field of Search ................ 297/250, 130, 457, 258

[56] References Cited

U.S. PATENT DOCUMENTS

| | | | |
|---|---|---|---|
| 3,393,941 | 7/1968 | Grosfillex | 297/457 |
| 3,659,865 | 5/1972 | Nothacker | 297/457 |
| 4,480,870 | 11/1984 | von Wimmersperg | 297/250 |
| 4,500,133 | 2/1985 | Nakao et al. | 297/250 |
| 4,598,945 | 7/1986 | Hopkins | 297/250 |
| 4,613,188 | 9/1986 | Tsuge et al. | 297/250 |
| 4,664,396 | 5/1987 | Pietrafesa | 297/130 |
| 4,697,845 | 10/1987 | Kamman | 297/130 |

Primary Examiner—Francis K. Zugel
Attorney, Agent, or Firm—Cumpston & Shaw

[57] ABSTRACT

An infant car seat is disclosed that is mountable on a cart of the type having a rear end wall and spaced therefrom a child back support wall having an upper crossbar. The rear portion of the infant car seat is provided with latch means engageable with the upper cross bar for releasably latching the car seat to the cart.

2 Claims, 3 Drawing Sheets

1

INFANT CAR SEAT MOUNTABLE ON A GROCERY CART

BACKGROUND OF THE INVENTION

1. Field of the Invention

The present invention relates generally to infant car seats, and more particularly to an infant car seat that is also mountable on a grocery cart or the like.

2. Description of the Prior Art

Infant car seats of the type having a rounded bottom to permit rocking of the infant, and further provided with a pivotal support member movable to a position for preventing rocking of the seat are well-known in the art. A disadvantage of such known infant car seats is that they are not capable of being mounted on a grocery cart or the like. Accordingly, a grocery shopper is required to place the infant and car seat within the grocery cart, or to leave the car seat in the car and provide some other means for carrying the infant.

SUMMARY OF THE INVENTION

An object of the present invention is to provide an infant car seat in accordance with the invention that is mountable on a cart of the type having a rear end wall, and spaced therefrom a child back support wall having an upper crossbar. The car seat comprises a car seat frame having a front end portion supportable by the rear end wall of the cart, and a rear end portion supportable by the crossbar of the cart. Accordingly, the child placed in the car seat will be facing the shopper. Latch means are provided on the rear end portion of the cart seat frame which are engageable with the upper crossbar for releasably latching the car seat to the cart.

Another object of the invention is to provide an infant car seat in which the rear end portion thereof has a pair of spaced side walls, and each side wall has a notch therein for receiving the crossbar.

A further object of the invention is to provide a latch means having a pivotal latch member having a hook at one end thereof, and spring means for urging the hook into latching engagement with the crossbar.

In still another object of the invention, the car seat frame has a curved bottom to allow the car seat frame to be rocked. The bottom of the infant car seat further has a pivotal support member that is pivotally movable between a retracted position to allow rocking, and an extended position to prevent rocking.

In a further object of the invention, the side walls of the car seat frame have elongated slots therein, and an inner peripheral support surface terminating in a recess. The support member has a pair of aligned stub shafts mountable within the elongated slots, and projections on the support member engageable with the support surface. Accordingly, when the support member is moved into its extended position, the weight of the car seat causes the stub shafts to slide along the elongated slots and the projections to bottom in the recesses for releasably holding the support member in its extended position.

BRIEF DESCRIPTION OF THE DRAWINGS

In the detailed description of the invention presented below, reference is made to the accompanying drawings, in which.

DETAILED DESCRIPTION OF THE INVENTION

Because grocery carts and infant car seats are well-known, the present description will be directed in particular to elements forming part of, or cooperating directly with, a car seat in accordance with the present invention. It is to be understood that elements not specifically shown or described may take various forms well-known to those skilled in the art.

Figure 1:
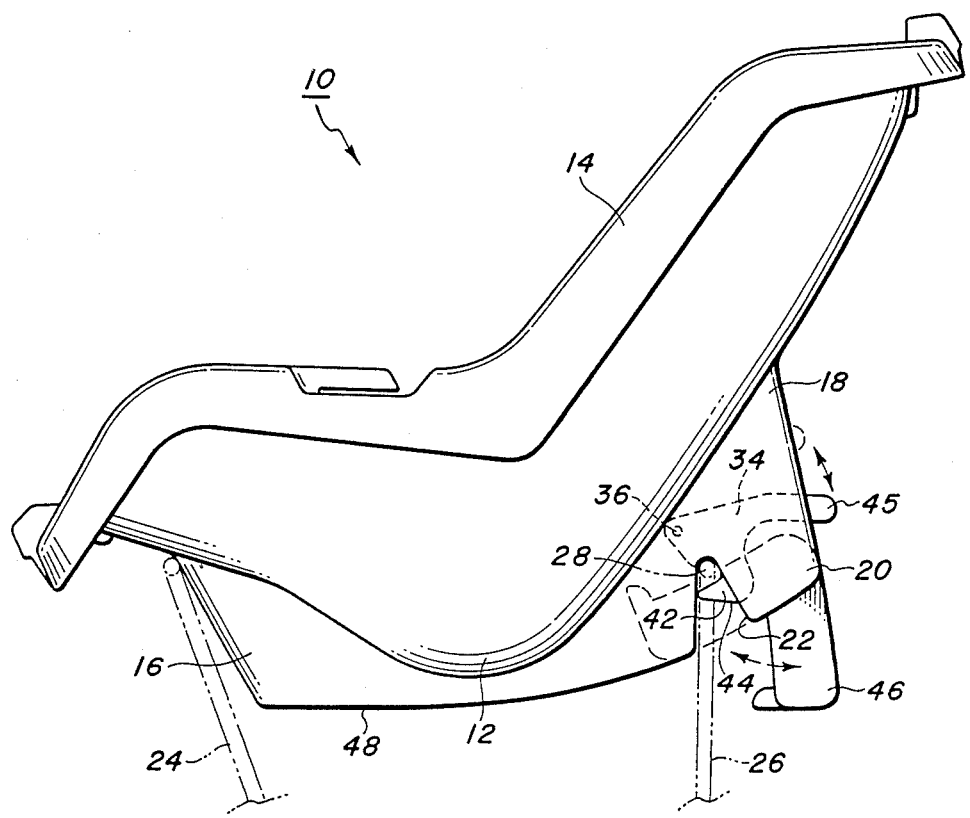
FIG. 1 is a side-elevational view of an infant car seat in accordance with the invention mounted on the rear end portion of a grocery cart, shown in phantom.
Figure 2:
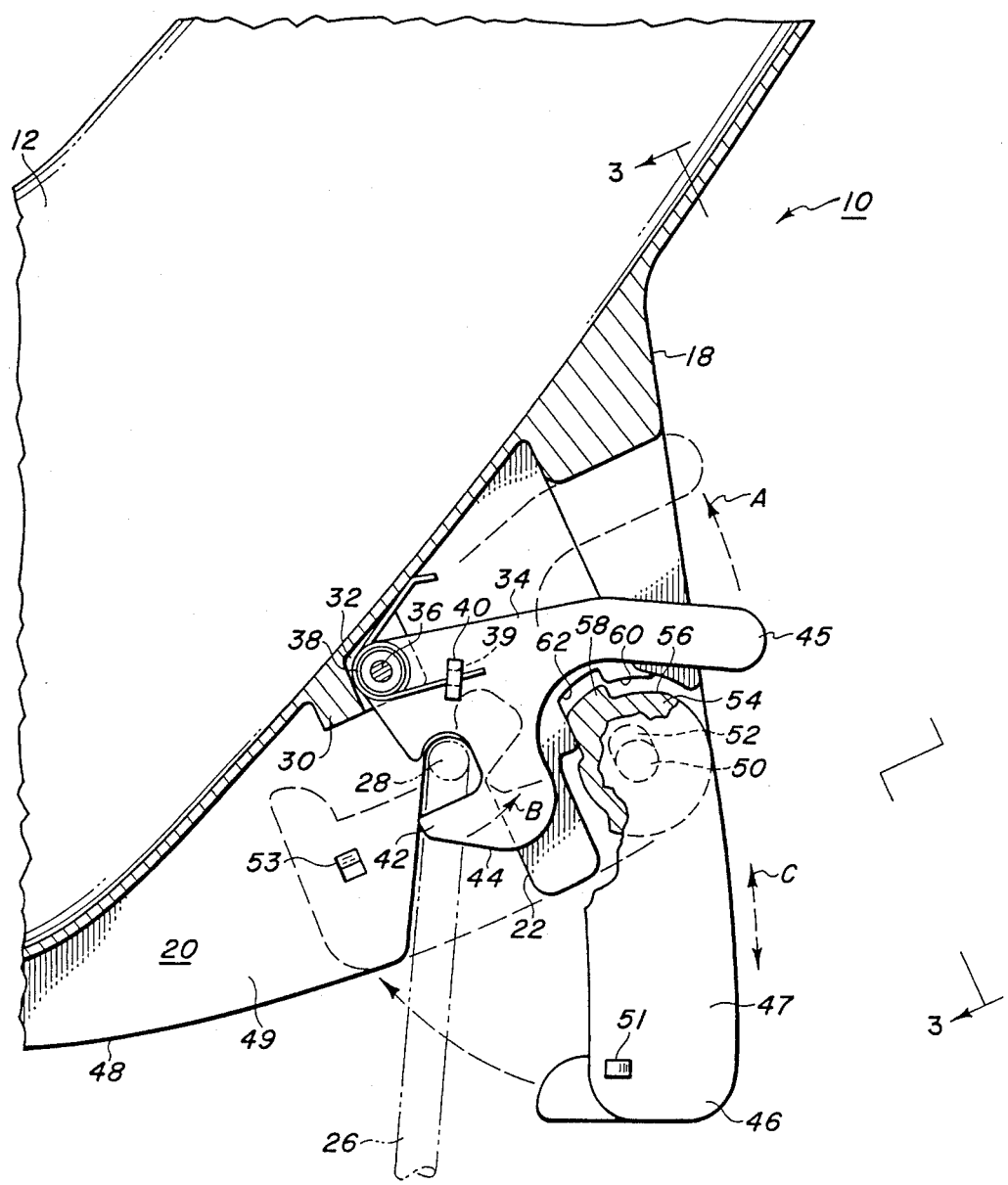
FIG. 2 is a segmental view partially in sec substantially along line 2—2 of FIG. 3.
Figure 3:
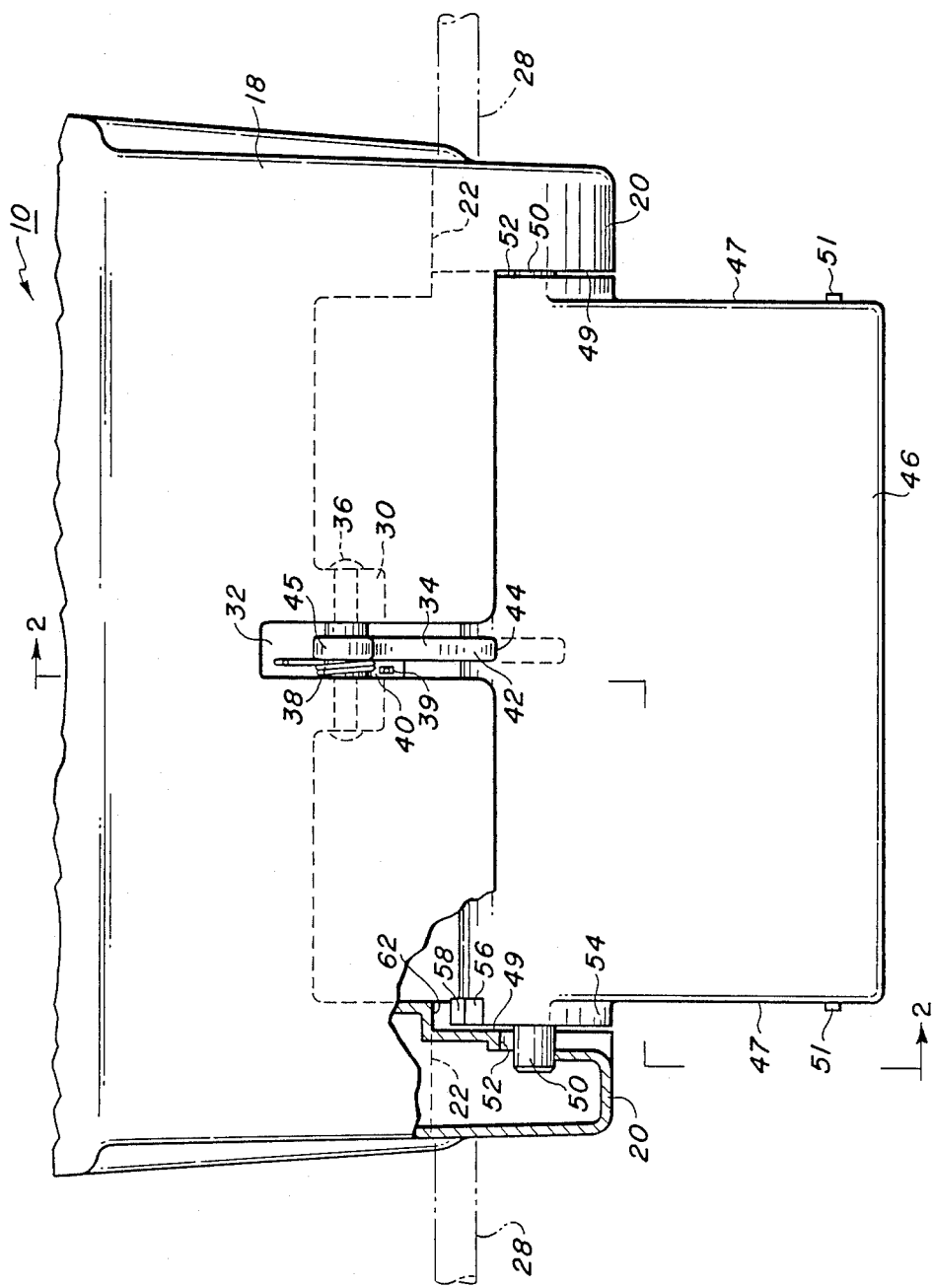
FIG. 3 is an end view of the car seat taken substantially along line 3—3 of FIG. 2, with a portion thereof broken away and sectioned.

With reference to FIGS. 1-3, a preferred embodiment of an infant car seat 10 is shown having a body frame 12 for supporting a plush baby basket or liner 14 within which the baby is placed. The frame bottom of 12 has a front end portion 16 and a rear end portion 18. The rear end portion has a pair of spaced side walls 20, as best seen in FIG. 3, each having a substantially V-shaped notch 22 therein. The infant car seat 10 is mountable on a number of the known grocery carts of the type having a rear perforated end wall 24, and a perforated child back support wall 26 having a cross bar 28 on the top thereof. The infant car seat 10 is mountable on the grocery cart with the front end portion 16 thereof resting on the rear end wall 24 of the cart, as best seen in FIG. 1. The notches 22 in the rear end portion 18 of the car seat receive cross bar 28.

Referring more specifically to FIGS. 2 and 3, rear end portion 18 of car seat 10 is provided with a central boss 30 having a slot 32 for receiving one end of a latch lever 34, which is pivotally mounted on a pin 36 extending through boss 30. A spring 38 encircles pin 36 and has one end thereof extending through an opening 39 in frame 12 and the opposite end thereof bearing against a lip 40 on lever 34 for biasing the lever in a clockwise direction. This causes a hook 42 at one end of lever 34 to pass beneath crossbar 28 for releasably latching car seat 10 to the cart. Normally, when car seat 10 is mounted on the cart, crossbar 28 engages the outer surface 44 of hook 42 and the weight of the car seat cams lever 34 upwardly in the direction of the arrows A and B (FIG. 2). When crossbar 28 passes the tip of hook 42, spring 38 biases lever 34 below the crossbar. Alternatively, the shopper can manually pivot the lever upwardly with handle 45, to allow passage of the crossbar past hook 42.

The infant car seat 10 preferably has a support member 46 which is preferably in a normal retracted position, as seen dotted in FIG. 2. The support member is preferably held in the retracted position by a friction fit between sides 47 of support member 46 and inner surface 49 of side walls 20. Alternatively, a detent comprising a lug 51 on each side 47 engageable with a notch 53 on each inner surface 49, as best seen in FIG. 2, can be used. In this retracted position, the outer surface of support member 46 conforms to the bottom curved surface 48 of car seat 10, to allow rocking movement of the car seat.

The support member 46 is further rectangularly shaped, and has stub shafts 50 extending from each side 47 which slide into elongated slots 52 in side walls 20 of car seat frame 12. The support member 46 further has a rim 54 on each side 47 coaxial with stub shaft 50. The rim 54 has a peripheral rim surface 56 terminating in a projection 58. The side walls 20 are provided with an inner peripheral surface 60 surrounding rim 54 and having a recess 62. When support member 46 is moved to its extended position, as seen in FIGS. 2 and 3, the weight of car seat 10 will cause stub shaft 50 and projections 58 to slide upwardly, as shown by an arrow C, with projections 58 entering recesses 62 for locking the support member in its extended position. Naturally, support member 46 must be moved from its normal retracted position into its extended position unblocking notches 22 before the infant car seat is mounted on the cart.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. An infant car seat that is mountable on a cart of the type having a rear end wall and a spaced child back support wall having an upper crossbar comprising:

a car seat frame having a rear end portion supportable by the upper crossbar of the cart; and said end-portion including a pair of spaced side walls, each side wall having a notch for receiving the crossbar; and pivotally movable latch member having a hook at one end thereof, and spring means for urging the hook into latching engagement with the crossbar for releasably latching the car seat to the cart, wherein the car seat frame has a curved bottom to allow the car seat frame to be rocked, the infant car seat further having means for preventing rocking movement of the car seat frame, and wherein the rocking preventing means comprises a pivotal support member pivotally mounted between said side walls and movable between a retracted position to allow rocking, and an extended position to prevent rocking and means for holding said support member in said extended position.

2. An infant car seat according to claim 1, wherein each of the side walls of the car seat frame have an elongated slot therein, and an inner peripheral support surface terminating in a recess, and the support member has a pair of aligned stub shafts mountable within the elongated slots, and projections on the support member engageable with the support surface, whereby when the support member is moved to its extended position, the stub shafts slide along the elongated slots and the projections bottom in the recesses for holding the support member in its extended position.

* * * * *